United States Patent [19]

Gabel

[11] 4,408,147

[45] Oct. 4, 1983

[54] METHOD AND APPARATUS FOR HIGH EFFICIENCY OPERATION OF ELECTROMECHANICAL ENERGY CONVERSION DEVICES

[76] Inventor: Jonathan Gabel, 5800 Ocean View Dr., Oakland, Calif. 94618

[21] Appl. No.: 358,697

[22] Filed: Mar. 16, 1982

Related U.S. Application Data

[63] Continuation-in-part of Ser. No. 143,044, Mar. 19, 1981.

[51] Int. Cl.³ .................................................. H02P 5/16
[52] U.S. Cl. .................................................. 318/493
[58] Field of Search ................................ 318/338, 493

[56] References Cited

U.S. PATENT DOCUMENTS

| | | | |
|---|---|---|---|
| 4,037,144 | 7/1977 | Ohmae et al. | 318/493 X |
| 4,191,914 | 3/1980 | Lecluse | 318/493 X |
| 4,247,807 | 1/1981 | Wilson | 318/493 X |
| 4,284,932 | 8/1981 | Kawada et al. | 318/493 X |
| 4,322,667 | 3/1982 | Ohba | 318/493 X |

Primary Examiner—J. V. Truhe
Assistant Examiner—W. E. Duncanson, Jr.
Attorney, Agent, or Firm—Fliesler, Dubb, Meyer & Lovejoy

[57] ABSTRACT

A method and apparatus are disclosed for controlling the conversion of electrical energy to mechanical energy as well as for controlling the conversion of mechanical energy to electrical energy. In a separately excited electromechanical energy conversion system, total system power losses are minimized by simultaneously controlling the currents flowing in the different windings of the energy conversion device such that these currents are related by an optimizing function. This method and apparatus are applicable to a wide variety of electric motors and generators.

21 Claims, 16 Drawing Figures

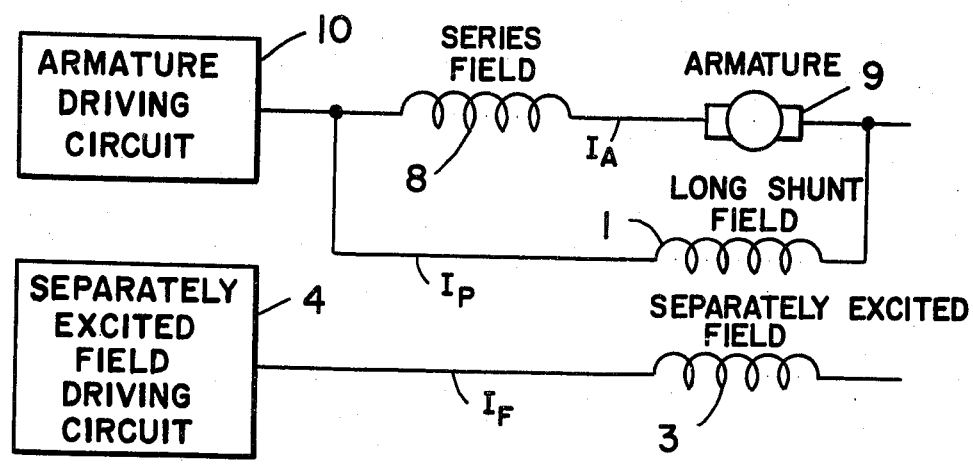
FIG_1
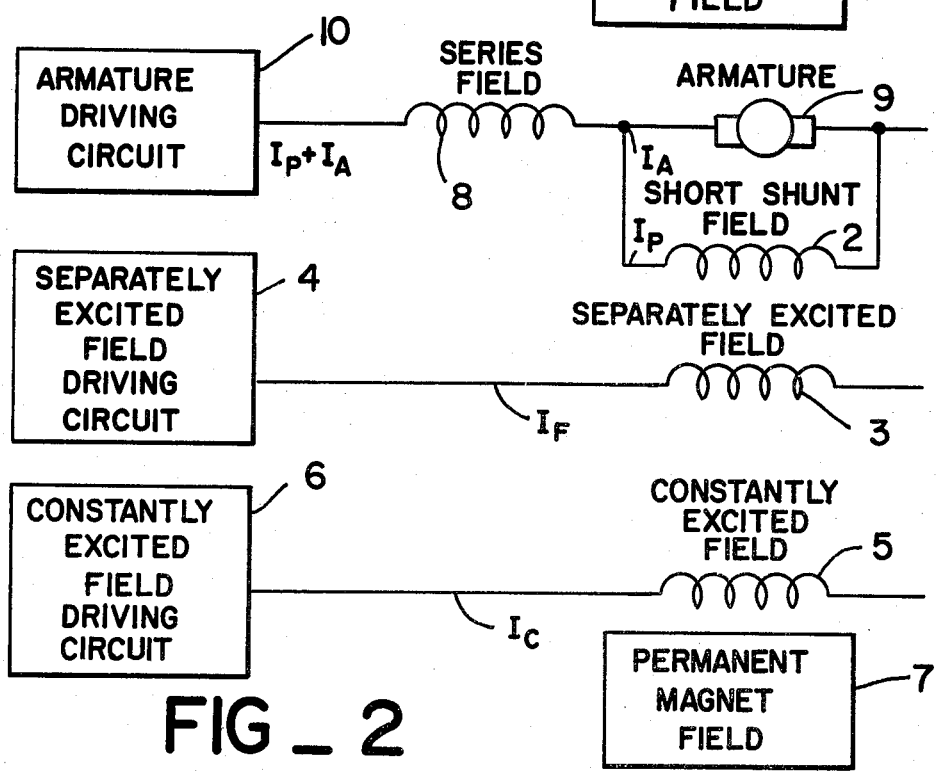
FIG_2

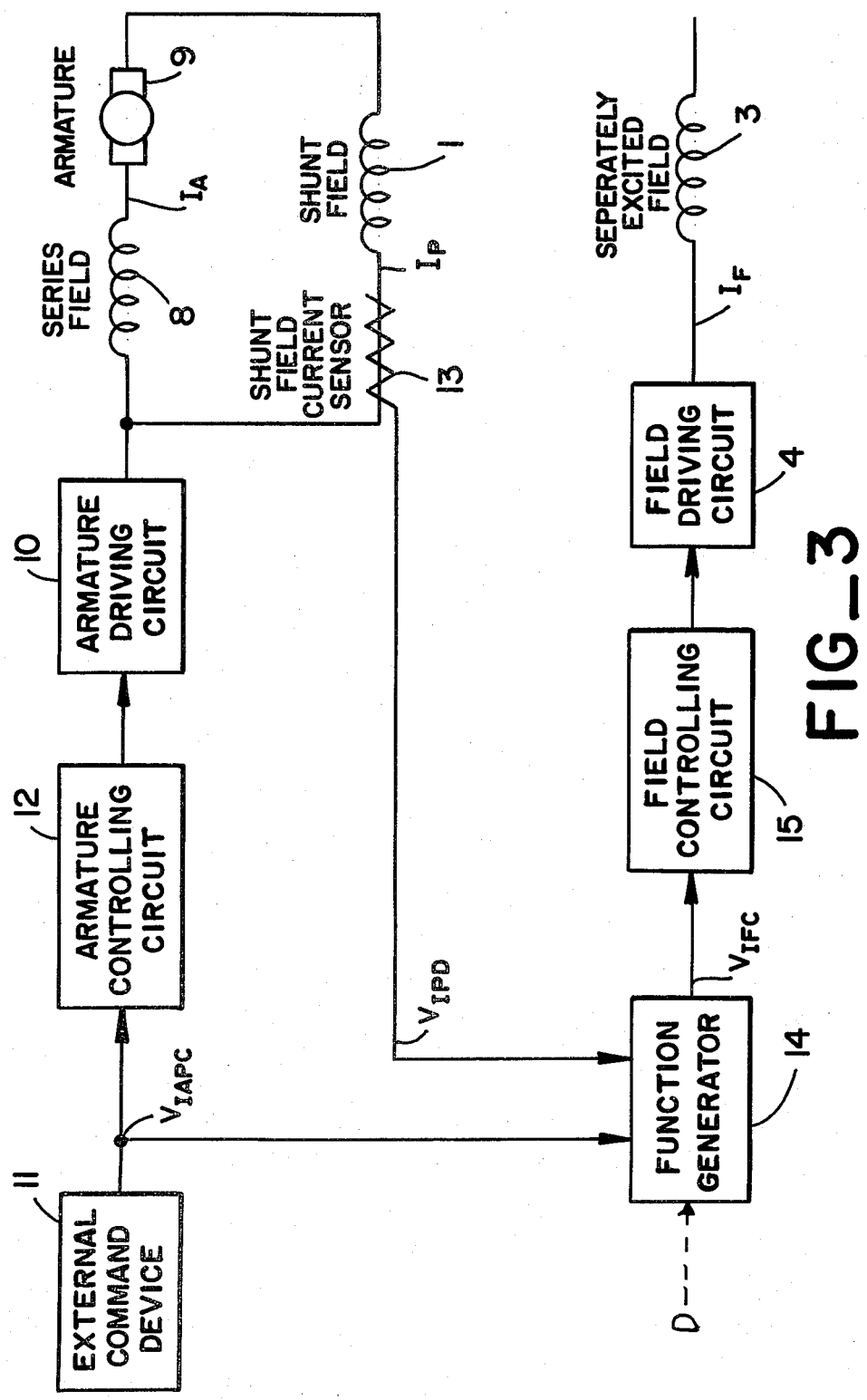
FIG_3

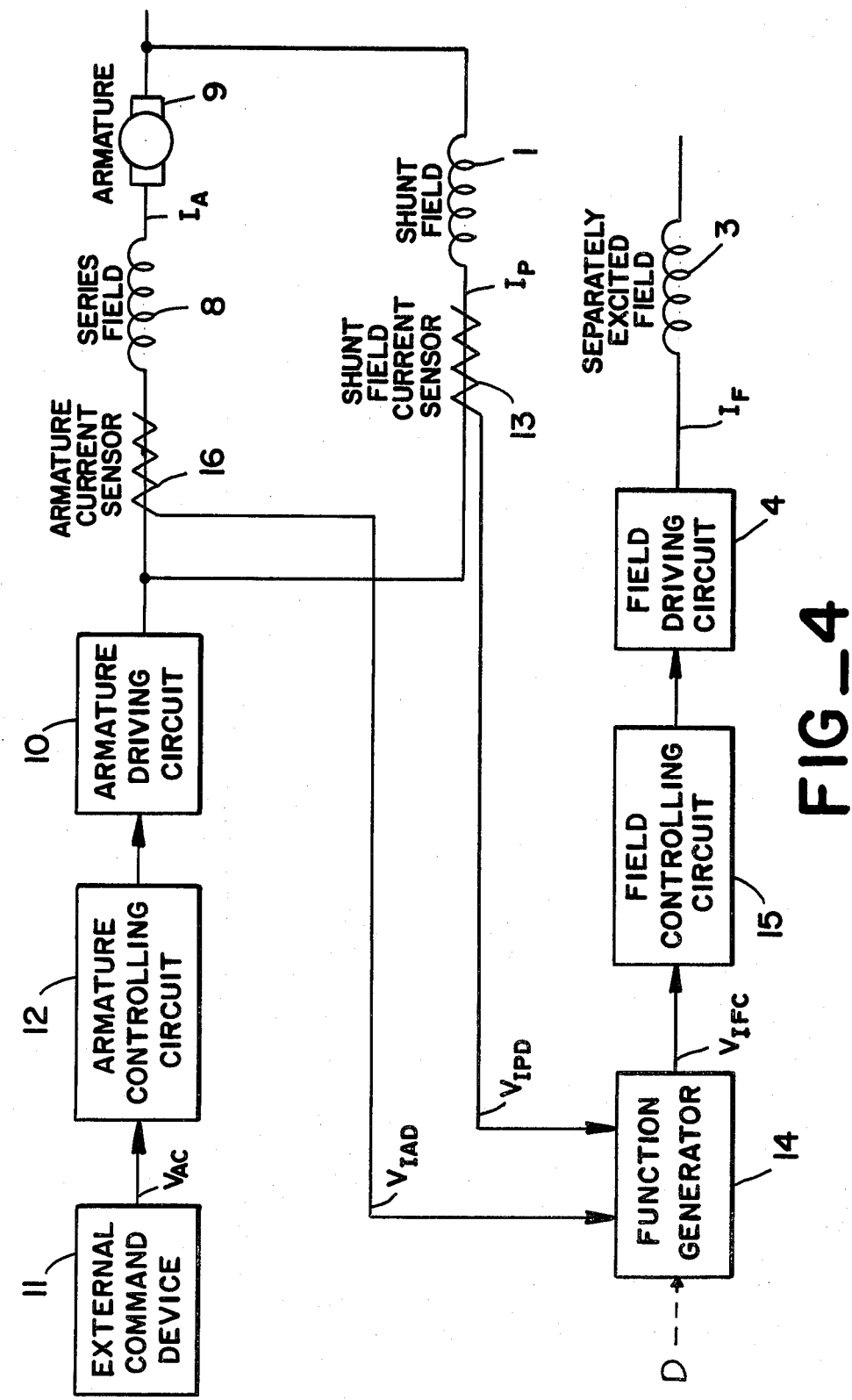
FIG_4

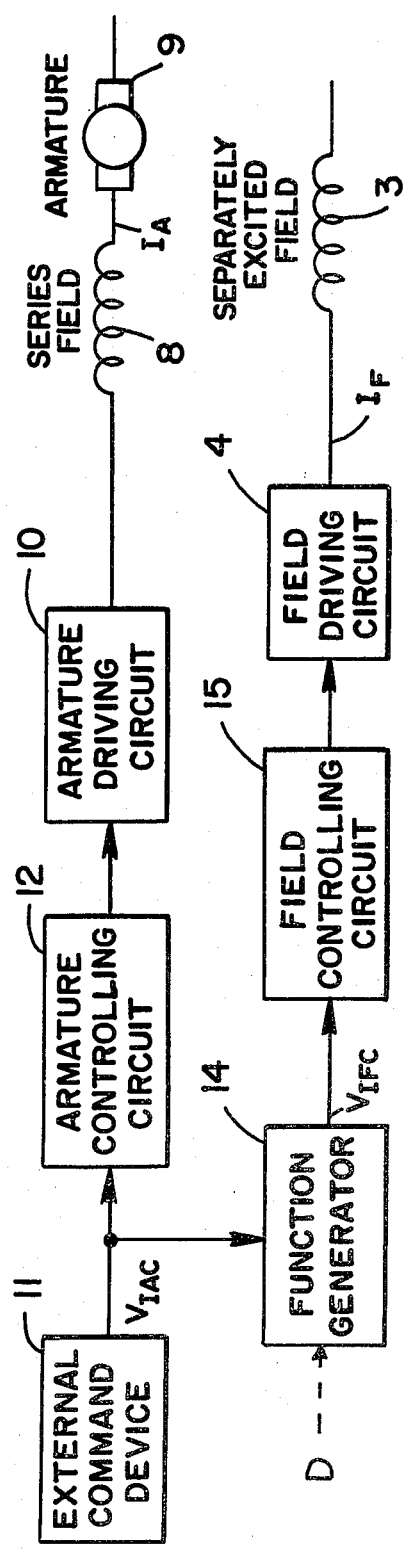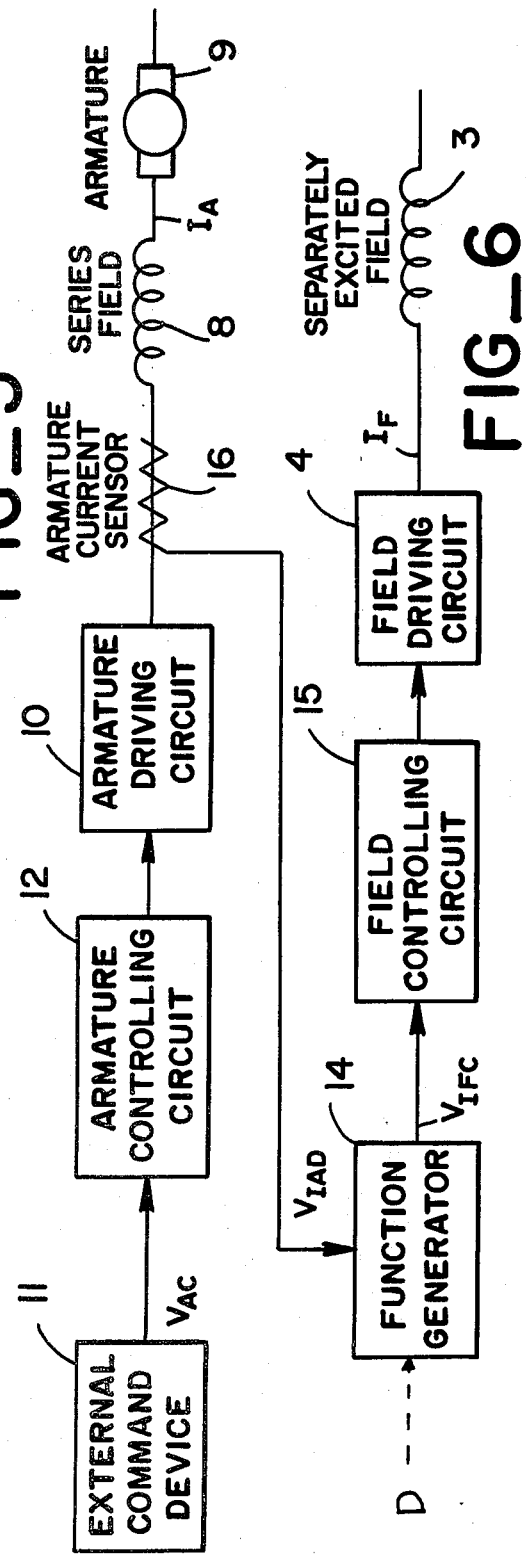
FIG_5
FIG_6

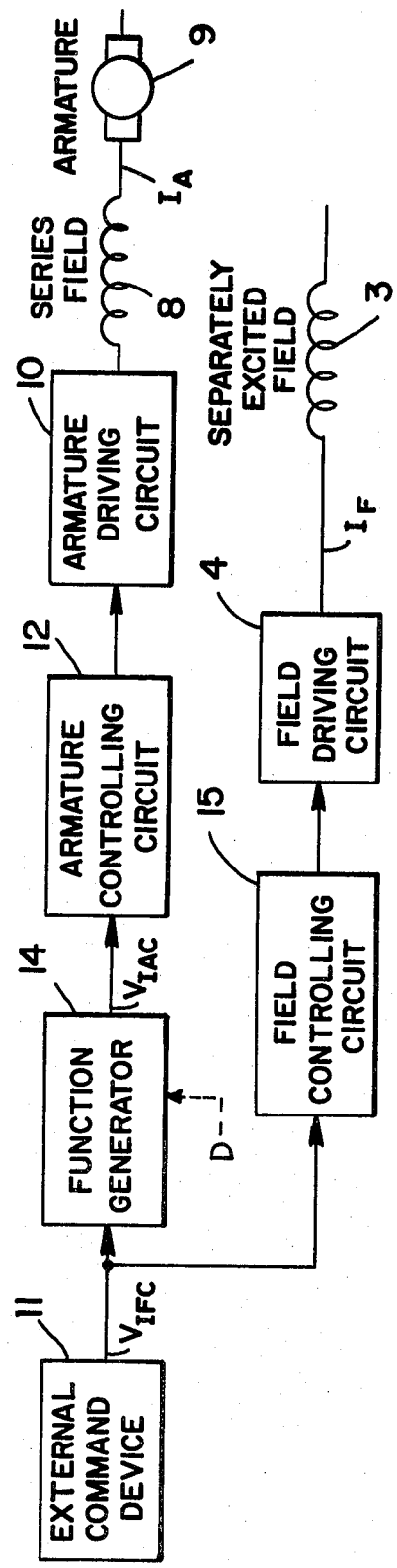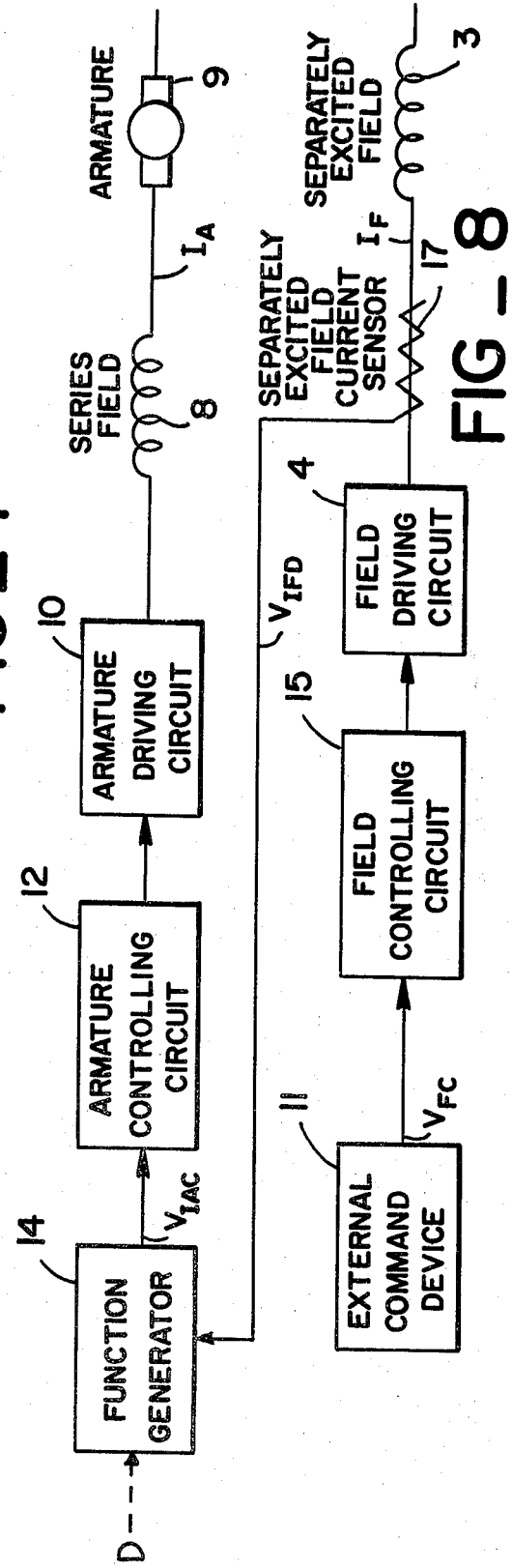

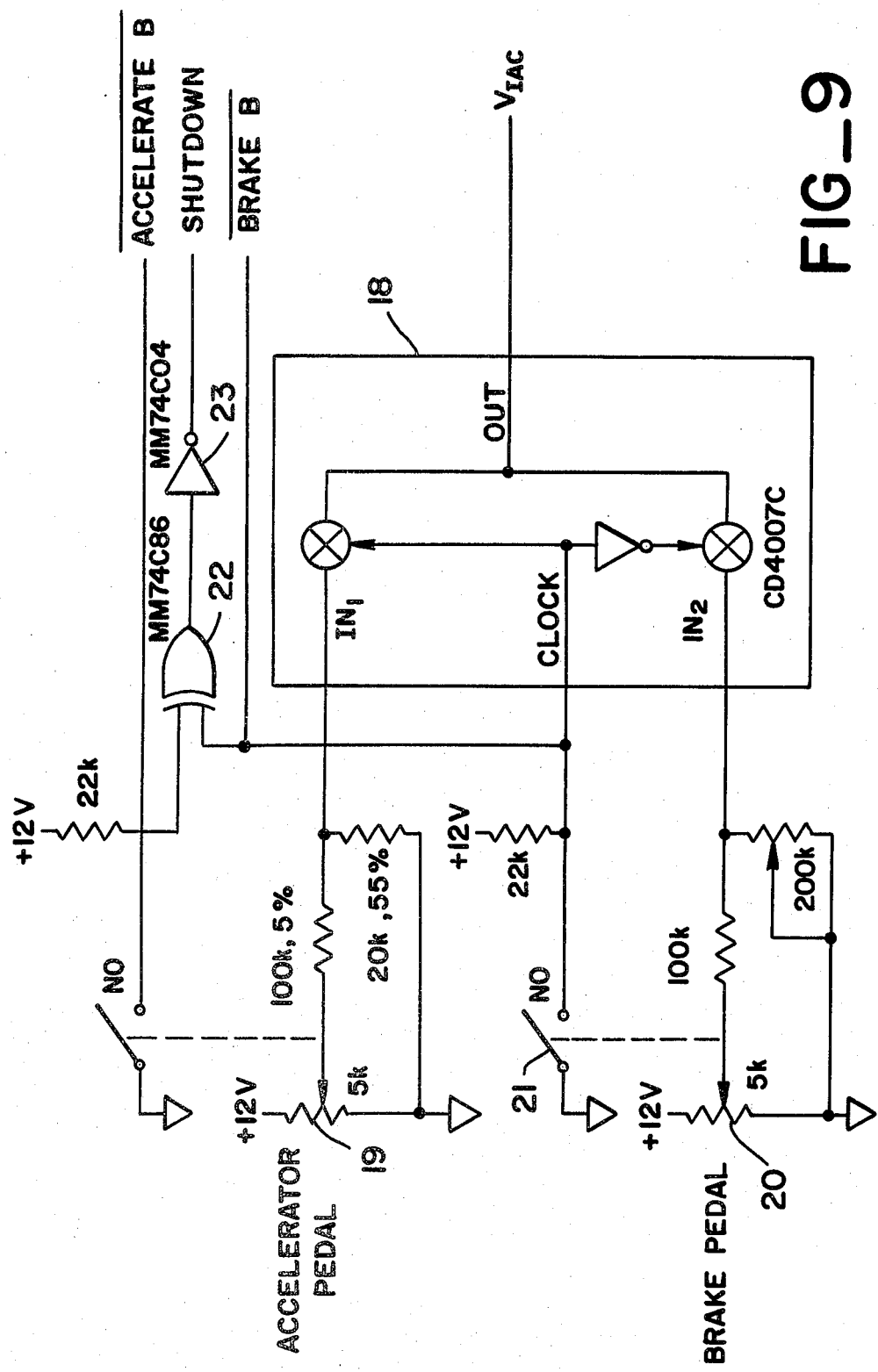
FIG_9

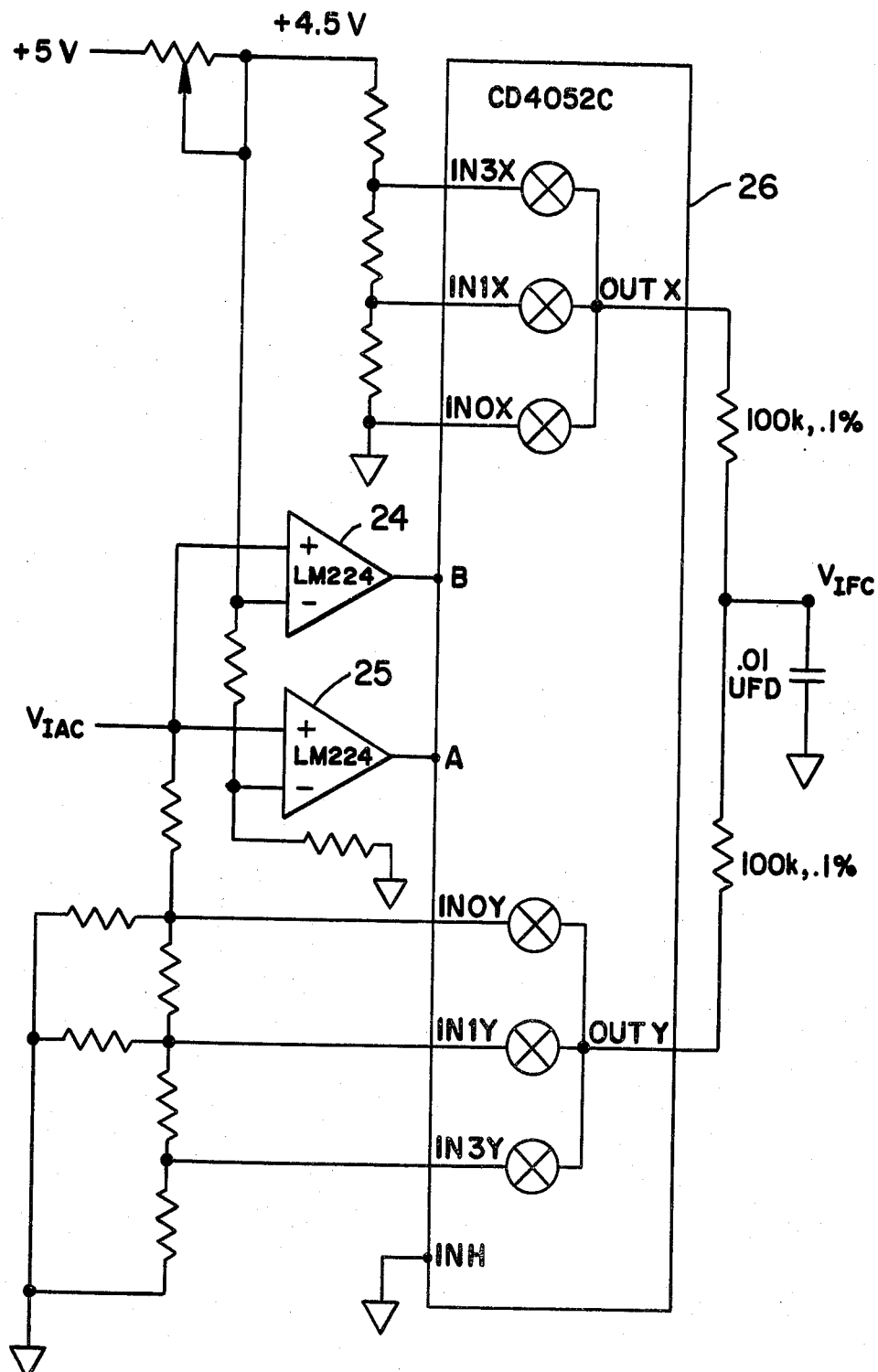
FIG_10

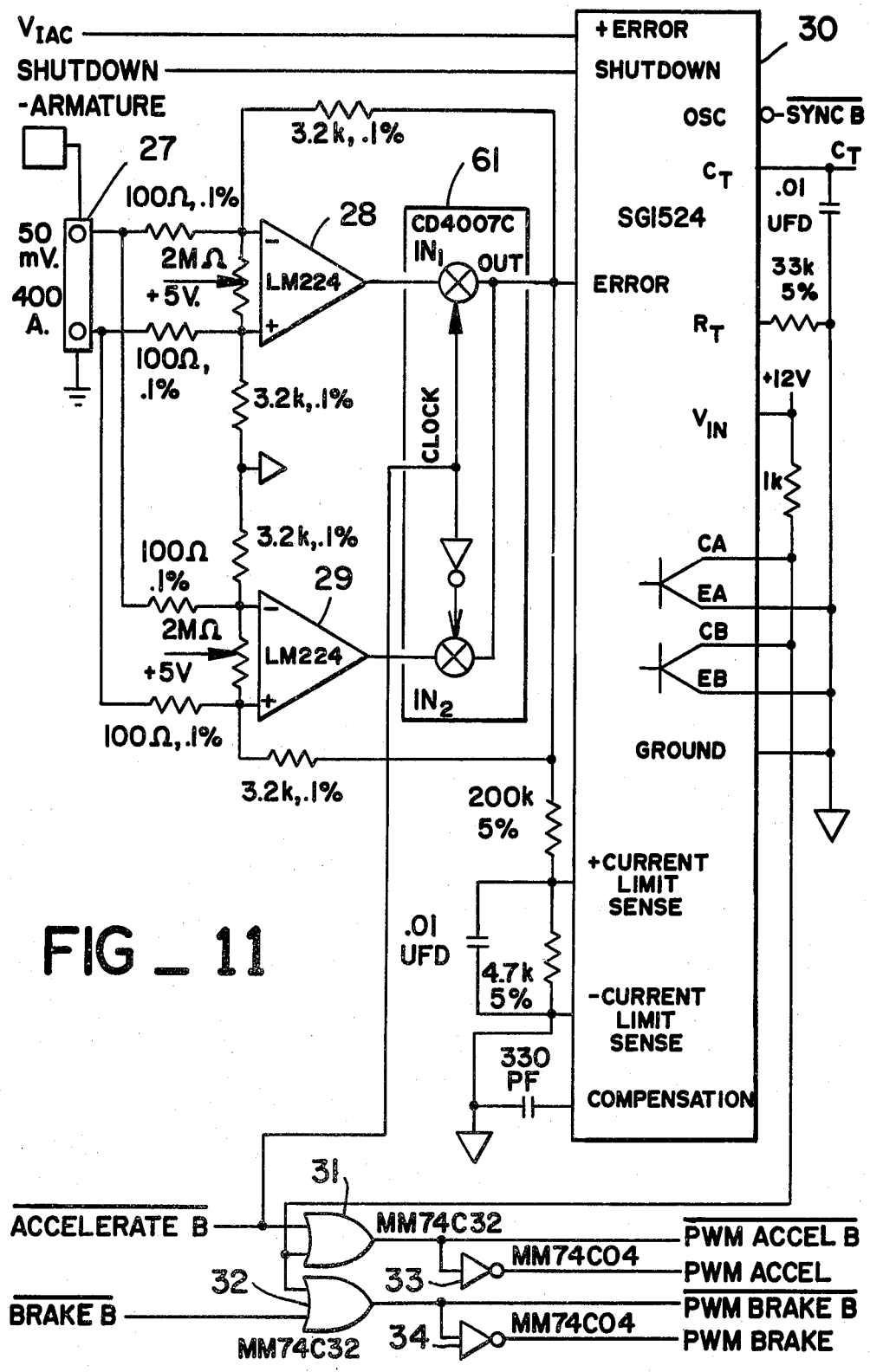
FIG _ 11

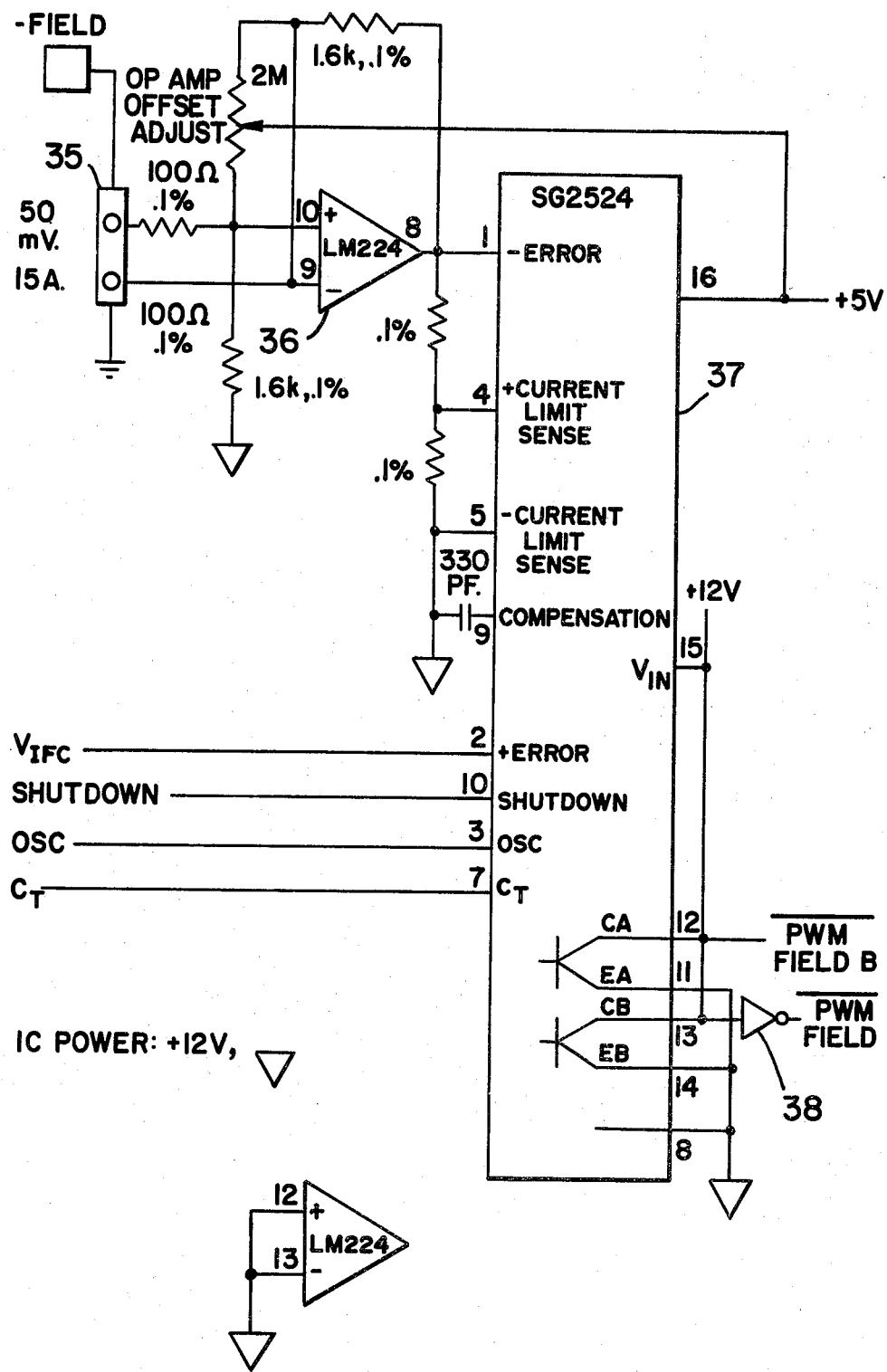
FIG_12

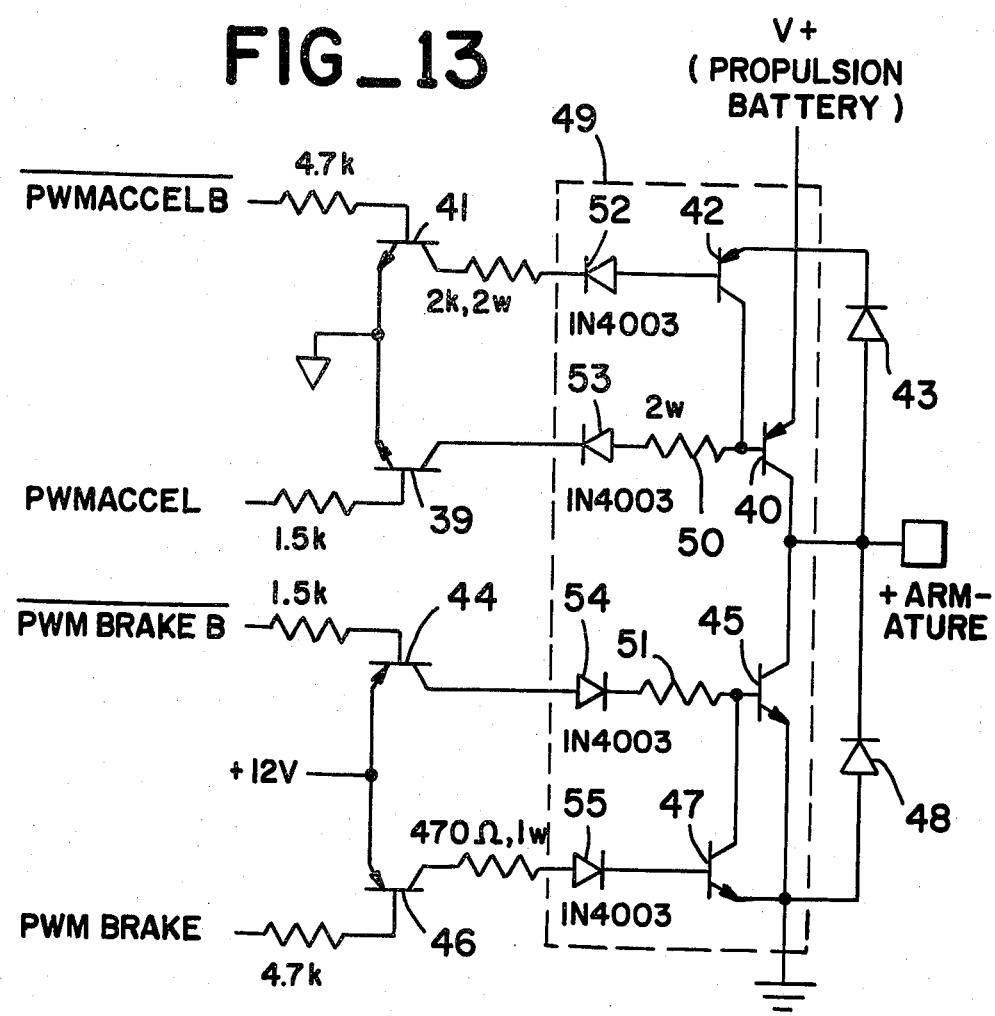
FIG_13
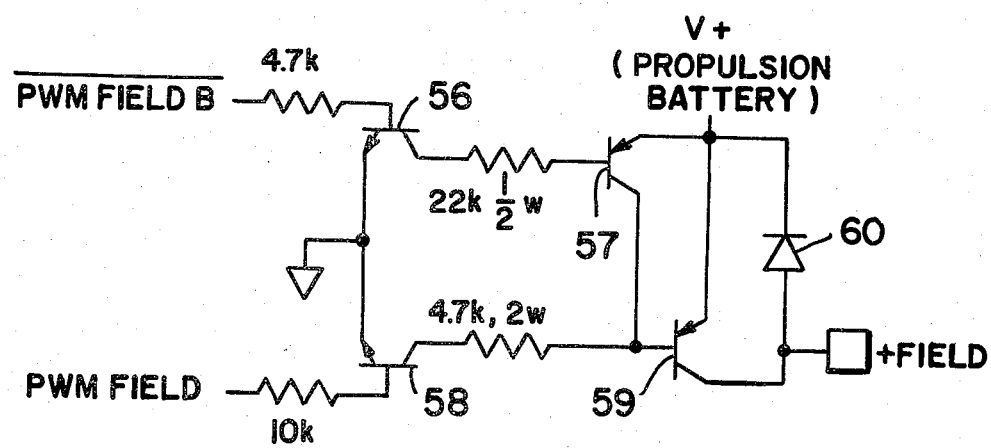
FIG_14

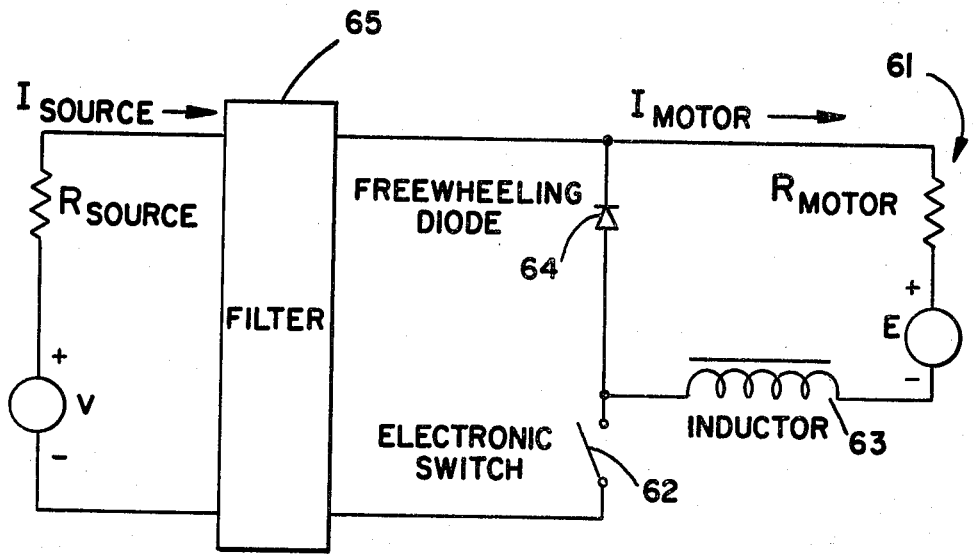
FIG — 15
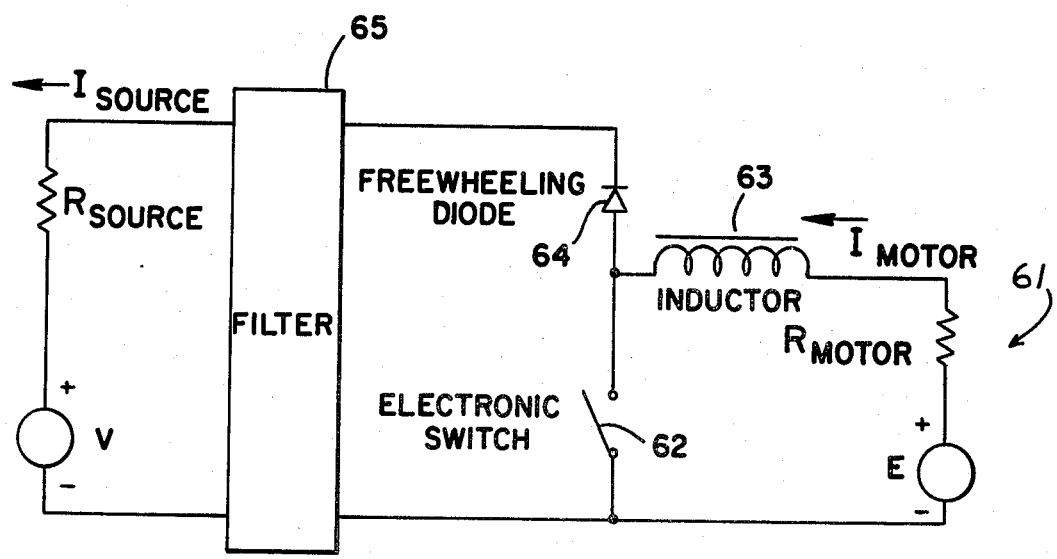
FIG — 16

METHOD AND APPARATUS FOR HIGH EFFICIENCY OPERATION OF ELECTROMECHANICAL ENERGY CONVERSION DEVICES

CROSS-REFERENCE TO RELATED APPLICATION

This application is a continuation-in-part of copending application Ser. No. 143,044, filed Mar. 19, 1981.

BACKGROUND OF THE INVENTION

1. Field of the Invention

This invention relates to a method and apparatus for minimizing the loss of power in all or part of a separately excited electromechanical energy conversion system having, for example, a chopper controller, battery power supply and electromechanical energy conversion device. An electromechanical energy conversion device having n spatially fixed windings, $n \geq 1$, for producing a magnetic field, and having m movable windings, $m \geq 1$, for producing a magnetic field which opposes the magnetic field produced by the n spatially fixed windings, is separately excited if the magnetic field produced by the n spatially fixed windings can be varied, at least in part, independently of the magnetic field produced by the m movable windings. For example, in a separately excited dc motor/generator, the n spatially fixed windings can be any combination of constantly excited field windings, series field windings, and shunt field windings, with at least one separately excited field winding. The m movable windings can be armature windings.

Hereafter, unless otherwise stated, the term "field" will be used to refer to the electrical circuit zf field winding(s). Also, the term "armature" will be used to refer to the electrical circuit of armature winding(s). This terminology is common in the literature.

2. Description of the Prior Art (a) First, the conversion of electrical energy to mechanical energy in a dc motor will be considered. Heretofore, the speed and torque control of a separately excited motor, in the low speed running mode, was carried out by maintaining the field current constant and varying the armature voltage, and in the high speed running mode, by maintaining the armature voltage constant and varying the field current. This type of two speed-range controller was modified by Ohmae et al. (Reference U.S. Pat. No. 4,037,144) as follows (I) Assume that the field magnetic flux is developed in proportion to the field current $I_F$.

(II) Assume that the field magnetic flux is independent of the armature current $I_A$.

(III) Assume that the field circuit resistance $R_F$ is not a function of field current $I_F$.

(IIIa) For a chopper controller, assume that $R_F$ is fixed.

(IV) Assume that the armature circuit resistance $R_A$ is not a function of armature current $I_A$.

(IVa) For a chopper controller, assume that $R_A$ is fixed.

(V) Then the electrical power loss $W = I_A{}^2 \cdot R_A + I_F{}^2 \cdot R_F$ is minimized when $$I_F = \sqrt{\frac{R_A}{R_F}} \cdot I_A$$

(VI) Therefore, modify a two speed-range controller to maintain the relationship of $I_F$ to $I_A$ as given in (V), unless the value of $I_F$ thus calculated exceeds minimum or maximum limits. In the latter case, maintain $I_F$ above the minimum limit or below the maximum limit, respectively.

The maximum limit on $I_F$ is stated by Ohmae et al. to be that level of current which causes the field magnetic circuit to be saturated. For a range of $I_F$ below this limit, assumptions (I) and (II) are invalid. The reason for this is that the incremental change in the field magnetic flux caused by a change in the field current is a function of both the field current magnitude and the armature current magnitude. Assumptions (III), (IIIa), (IV) and (IVa) can also be significantly inaccurate. The present invention can achieve higher efficiency because it is not based on the above assumptions.

The implementation of (VI) by Ohmae et al, still requires a two speed-range controller. The present invention provides a simpler apparatus.

In a paper titled "Minimization of Electrical Losses in a Battery Electric Vehicle" by J. Morton, J. Jones, and C. Watson, presented at Drive Electric 80, Wembley, UK, Oct. 16, 1980, another scheme for minimizing $I^2R$ losses in a motor system was presented. In this scheme, field flux is assumed to be represented by a second degree polynomial in field current, independent of armature current. Armature chopper duty cycle and field chopper duty cycle are controlled simultaneously as a function of accelerator pedal position and motor speed. (No algorithm for determining the appropriate values of armature chopper duty cycle and field chopper duty cycle for different accelerator pedal positions and motor speeds is given.) Since the armature chopper duty cycle and the field chopper duty cycle are controlled and not the armature current and the field current, this method depends on the relationship between chopper duty cycle and chopper current in order for the system optimization to work. One problem is that this relationship is dependent on the stability of circuit parameters which in fact can vary due to manufacturing tolerances, temperature, and component aging. In particular, the relationship of armature current to armature chopper duty cycle is very sensitive.

The present invention makes no assumptions regarding field flux as a function of field current or armature current. Furthermore, the present invention controls motor currents directly, which is a more efficacious way to minimize power loss in the system than controlling chopper duty cycles. Also, the present invention is not limited to minimizing $I^2R$ losses; all electrical losses can be minimized, such as magnetic losses, which are modelled as $I^2R$ losses.

(b) Second, in considering the conversion of mechanical energy to electrical energy, no prior references were found regarding power loss minimization.

OBJECTS OF THE PRESENT INVENTION

It is accordingly an object of the present invention to provide a method and apparatus for minimizing the loss of power in a separately excited electromechanical energy conversion device and in its controller.

It is another object of the present invention to provide a method and apparatus for minimizing total system power loss including power loss in a separately excited electromechanical energy conversion device, in its controller and in its electrical power source (for motors) or its electrical load (for generators).

Another object of the present invention is to provide this minimization both for the conversion of electrical energy to mechanical energy as well as for the conversion of mechanical energy to electrical energy.

Another object of the present invention is to provide this minimization for a wide variety of motors and generators, including devices having a shunt field as well as devices lacking a shunt field.

Other objects of the present invention will be evident to those skilled in the art from the description of the preferred embodiments and from the claims.

BRIEF DESCRIPTION OF THE DRAWINGS

FIG. 1 is a block diagram of a separately excited electromechanical energy conversion device with a "Long shunt" field;

FIG. 2 is a block diagram of a separately excited electromechanical energy conversion device with a "Short shunt" field;

FIG. 3 is a block diagram of one embodiment of the present invention;

FIG. 4 is a block diagram of another embodiment of the present invention;

FIG. 5 is a block diagram of another embodiment of the present invention;

FIG. 6 is a block diagram of another embodiment of the present invention;

FIG. 7 is a block diagram of another embodiment of the present invention;

FIG. 8 is a block diagram of another embodiment of the present invention;

FIG. 9 is a schematic of an External Command Device;

FIG. 10 is a schematic of a Function Generator;

FIG. 11 is a schematic of an Armature Controlling Circuit;

FIG. 12 is a schematic of a Field Controlling Circuit;

FIG. 13 is a schematic of an Armature Driving Circuit;

FIG. 14 is a schematic of a Field Driving Circuit;

FIG. 15 is a schematic of a forward or step down chopper control circuit; and

FIG. 16 is a schematic of a flyback or step up chopper control circuit.

DETAILED DESCRIPTION OF THE PRESENT INVENTION

The Method

The following derivation is applicable to an energy conversion device, in particular to a dc motor/generator with an armature, a permanent magnet field, a constantly excited field, a series field, a long shunt field or a short shunt field, and a separately excited field. An optimizing function $f_{OPT}$ is derived, wherein $f_{OPT}$ gives the desired relationship between the currents in the various windings of the device in order for the total power loss in the system to be minimized. For other types or other configurations of energy conversion devices, a similar derivation will produce the corresponding optimizing function $f_{OPT}$. The optimizing function $f_{OPT}$ can be predetermined from the characteristics of the energy conversion system being optimized; or $f_{OPT}$ can be periodically determined by an adaptive controller that measures, directly or indirectly, any characteristics of the energy conversion system that can vary.

In applying this method, approximations of $f_{OPT}$ can be used, with the resulting power losses dependent upon the accuracy of the approximation. Examples of approximations of $f_{OPT}$ that can be used are: a power series approximation; a piecewise-linear approximation; and a sum of step functions approximation.

Furthermore, the currents in the various windings of the energy conversion device can each be a different function of the command signal that operates the controller, as long as these currents satisfy the optimizing function $f_{OPT}$. That is, if the amplitude of the command signal is A, and if the current in winding i of the energy conversion device is $I_i(A)$, where $1 \geq i \geq n+m$, then overall power losses are minimized if $I_1(A)$, $I_2(A)$, ..., $I_n(A)$, $I_{n+1}(A)$, $I_{n+2}(A)$, ..., $I_{n+m}(A)$ satisfy the optimizing function $f_{OPT}$.

Because the method of the present invention can be practiced in different ways, the drawings relating to the description of this method show only the driving circuits of the controller connected to the energy conversion device. FIG. 1 illustrates a controller connected to a device with a Long Shunt Field 1. FIG. 2 illustrates a controller connected to a device with a Short Shunt Field 2. For the energy conversion device and the controller, $$\text{Power Lost} = I_P^2 \cdot R_P + I_A^2 \cdot R_{A1} + (I_P + I_A)^2 \cdot R_{A2} + I_F^2 \cdot R_F + I_C^2 \cdot R_C \quad (1)$$

where
$I_P$ = Shunt Field current
$I_A$ = Armature current
$I_F$ = Separately Excited Field current
$I_C$ = Constantly Excited Field current
$R_P$ = resistance of Shunt Field (1 in FIG. 1, 2 in FIG. 2)
$R_F$ = sum of resistance of Separately Excited Field (3 in FIGS. 1 and 2) and Separately Excited Field Driving Circuit (4 in FIGS. 1 and 2)
$R_C$ = sum of resistance of Constantly Excited Field (5 in FIGS. 1 and 2) and Constantly Excited Field Driving Circuit (6 in FIGS. 1 and 2)

$R_{A1}$ and $R_{A2}$ are defined differently for the Long Shunt configuration and the Short Shunt configuration:

$R_{A1}$ = sum of resistance of Series Field 8 and Armature 9 (FIG. 1); or
$R_{A1}$ = resistance of Armature 9 (FIG. 2)
$R_{A2}$ = resistance of Armature Driving Circuit 10 (FIG. 1); or
$R_{A2}$ = sum of resistance of Series Field 8 and Armature Driving Circuit 10 (FIG. 2)

By using these two definitions for $R_{A1}$ and $R_{A2}$, the following discussion applies to both the Long Shunt configuration (FIG. 1) and the Short Shunt configuration (FIG. 2), although the remaining drawings illustrate only the Long Shunt configuration.

$$T = I_A \cdot f_E(I_P, I_A, I_F, I_C, \phi) = I_A \cdot f_E$$

where
$T$ = mechanical torque input or output
$\phi$ = strength of Permanent Magnet Field (7 in FIGS. 1 and 2)

Substituting $I_A = T/f_E$ into (1):

$$\text{Power Lost} = I_P^2 \cdot R_P + \left(\frac{T}{f_E}\right)^2 \cdot R_{A1} + \left(I_p + \frac{T}{f_E}\right)^2 \cdot R_{A2} + \quad (2)$$

$$I_F^2 \cdot R_F + I_C^2 \cdot R_C$$

Differentiating (2) with respect to $I_F$ and setting the result equal to zero:

$$\frac{\partial(\text{Power Lost})}{\partial I_F} = \quad (3)$$

$$\left(2 I_P \cdot R_P \cdot \frac{\partial I_P}{\partial I_F}\right) + \left(I_P^2 \cdot \frac{\partial R_P}{\partial I_P} \cdot \frac{\partial I_P}{\partial I_F}\right) + \frac{T^2}{(f_E)^4} \cdot$$

$$\left((f_E)^2 \cdot \frac{\partial R_{A1}}{\partial I_A} \cdot \frac{\partial I_A}{\partial I_F} - 2 R_{A1} \cdot f_E \frac{\partial f_E}{\partial I_F}\right) + 2 \left(I_p + \frac{T}{f_E}\right) \cdot$$

$$\left(\frac{\partial I_P}{\partial I_F} - \frac{T}{(f_E)^2} \frac{\partial f_E}{\partial I_F}\right) \cdot R_{A2} +$$

$$\left(\left(I_P + \frac{T}{f_E}\right)^2 \cdot \frac{\partial R_{A2}}{\partial(I_A + I_P)} \frac{\partial(I_A + I_P)}{\partial I_F}\right) +$$

$$2 I_F \cdot R_F + I_F^2 \cdot \frac{\partial R_F}{\partial I_F} = 0$$

Substituting $I_A$ for $T/f_E$ in (3);

$$\left(2 I_P \cdot R_P \frac{\partial I_P}{\partial I_F}\right) + \left(I_P^2 \cdot \frac{\partial R_P}{\partial I_P} \frac{\partial I_P}{\partial I_F}\right) + \quad (4)$$

$$\left(I_A^2 \cdot \frac{\partial R_A}{\partial I_A} \frac{\partial I_A}{\partial I_F}\right) - \left(2 \frac{I_A^2 R_{A1}}{f_E} \frac{\partial f_E}{\partial I_F}\right) +$$

$$\left(2 \cdot (I_P + I_A) \cdot \left(\frac{\partial I_P}{\partial I_F} \frac{I_A R_{A2}}{f_E} \frac{\partial f_E}{\partial I_F}\right)\right) +$$

$$\left((I_P + I_A)^2 \cdot \frac{\partial R_{A2}}{\partial(I_A + I_P)} \frac{\partial(I_A + I_P)}{\partial I_F}\right) +$$

$$(2 I_F \cdot R_F) + \left(I_F^2 \cdot \frac{\partial R_F}{\partial I_F}\right) = 0$$

$f_E(I_P,I_A,I_F,I_C,\phi)$ can be measured, for example, by performing a blocked rotor test on the energy conversion device. With $I_C$ and $\phi$ constant, T can be measured for different values of $I_P$, $I_A$, and $I_F$. Then $$f_E(I_P,I_A,I_F) = T/I_A$$

Therefore, (4) can be solved numerically to give $$I_F = f_{OPT}(I_A,I_P)$$

$f_{OPT}$ is the optimizing function referred to previously. If the energy conversion device lacks a shunt field, then (4) becomes $$I_A^2 \cdot \left(\left(\frac{\partial R_A}{\partial I_A} \frac{\partial I_A}{\partial I_F}\right) - \left(2 \frac{R_A}{f_E} \frac{\partial f_E}{\partial I_F}\right)\right) + \quad (5)$$

$$(2 I_F \cdot R_F) + \left(I_F^2 \cdot \frac{\partial R_F}{\partial I_F}\right) = 0$$

where $R_A = R_{A1} + R_{A2}$ (5) can be solved numerically for $I_F = f_{OPT}(I_A)$ or $I_A = f_{OPT}^{-1}(I_F)$.

If $R_A$ and $R_F$ have only small nonlinearities, then $\delta R_A/\delta I_A$ and $\delta R_F/\delta I_F$ are small and (5) becomes $$I_A = \sqrt{\frac{R_F \cdot I_F \cdot f_E}{R_A \cdot \frac{\partial f_E}{\partial I_F}}} = f_{OPT}^{-1}(I_F)$$

When an armature or a field driving circuit is, in particular, a chopper, the value of that circuit's resistance becomes dependent on the chopper duty cycle. This is because the power source resistance (for motors) or the load resistance (for generators) is switched in and out by the chopper. In a system having an electromechanical energy conversion device with n+m windings, the duty cycle of the chopper circuit that drives winding i is $D_i$, $\leq i \leq n+m$. The following is a detailed analysis of this effect.

The schematic of a forward or step down chopper circuit is shown in FIG. 15. The load 61 can be a motor armature winding (E=back emf, E<V) or a motor field winding (E=O). When the electronic switch 62 is closed, current $I_{SOURCE}$ flows from the voltage source whose voltage is V. Current $I_{MOTOR}$ flows through the load 61, the inductor 63, and the switch 62. When the switch 62 is open, $I_{MOTOR}$ flows through the load 61, the inductor 63, and the freewheeling diode 64. With no filter 65, $I_{SOURCE} = I_{MOTOR}$ when the switch 62 is closed, and $I_{SOURCE} = 0$ when the switch 62 is open. Let $R_{MOTOR}$ = the resistance of the motor/generator 61
$R_{SWITCH}$ = the resistance of the electronic switch 62
$R_{INDUCTOR}$ = the resistance of the inductor 63
$R_{DIODE}$ = the resistance of the freewheeling diode 64
$R_{SOURCE}$ = the resistance of the voltage source
$D_i$ = the fraction of the time that the switch 62 is on, i.e., the duty cycle of the chopper. As previously indicated, generally $D_i$ is the duty cycle for an armature chopper or a field chopper. Then the effective resistance to current $I_{MOTOR}$ is $$R_{EFFECTIVE} = R_{MOTOR} + R_{INDUCTOR} + [D_i \times (R_{SWITCH} + R_{SOURCE})] + [(1-D_i) \times R_{DIODE}]$$

If the current flowing into the voltage source whose voltage is V is filtered by filter 65 so that $I_{SOURCE}$ is nearly constant, then $$I_{SOURCE} = D_i \times I_{MOTOR}$$

$$I^2_{SOURCE} \times R_{SOURCE} = (D^2 \times R_{SOURCE}) \times I^2_{MOTOR}$$

The equivalent source resistance to $I_{MOTOR}$ is $D_i^2 \times R_{SOURCE}$. Then $$R_{EFFECTIVE} = R_{MOTOR} + R_{INDUCTOR} + (D_i^2 \times R_{SOURCE}) + (D_i \times R_{SWITCH}) + [(1 - D_i) \times R_{DIODE}]$$

The schematic of a flyback or step up chopper circuit is shown in FIG. 16. This circuit applies only to a motor armature winding, with E<V. When the electronic switch 62 is closed, current $I_{MOTOR}$ flow through the armature winding 61, the inductor 63, and the switch 62. When the switch 62 is open, $I_{MOTOR}$ flows in the armature winding 61, the inductor 63, and the freewheeling diode 64. With no filter 65, $I_{SOURCE} = I_{MOTOR}$ when the switch 62 is open, and $I_{SOURCE} = 0$ when the switch 62 is closed.

The effective resistance to current $I_{MOTOR}$ is $$R_{EFFECTIVE} = R_{MOTOR} + R_{INDUCTOR} + (D_i \times R_{SWITCH}) + [(1 - D_i) \times (R_{SOURCE} + R_{DIODE})]$$

If the current flowing into the voltage source whose voltage is V is filtered by filter 65 so that $I_{SOURCE}$ is nearly constant, then $I_{SOURCE} = (1 - D_i) \times I_{MOTOR}$. The equivalent source resistance to $I_{MOTOR}$ is $(1 - D_i)^2 \times R_{SOURCE}$. Then $$R_{EFFECTIVE} = R_{MOTOR} + R_{INDUCTOR} + (D_i \times R_{SWITCH}) + [(1 - D_i \times R_{DIODE}] + [(1 - D_i)^2 \times R_{SOURCE}]$$

For a armature circuit, this dependence of circuit resistance on chopper duty cycle can be converted to an equivalent dependence of circuit resistance on motor speed. The following is a detailed analysis of this effect.

For a forward converter driving an armature winding $$D_i = \frac{E + (I_A \times R_A)}{V} = \frac{[f_E(I_F, I_A) \times \omega] + (I_A \times R_A)}{V}$$

where $R_A$ is the armature circuit resistance and $\omega$ is the motor speed in radians per second.

For a step up converter $$1 - D_i = \frac{E - (I_A \times R_A)}{V} = \frac{[f_E(I_F, I_A) \times \omega] - (I_A \times R_A)}{V}$$

In both cases, $D_i$ is related to $\omega$. Hereafter [$D_1, D_2, \ldots, D_{n+m}$] is referred to simply as D a multivalued variable; also, in defining D, $\omega$ can be substituted for any $D_i$ that is the duty cycle of a chopper driving an armature winding. In this way, the dependence of $f_{OPT}$ on D is made more general.

In energy conversion systems having a high power source resistance (for motors) or a high load resistance (for generators), as for example in battery powered systems, this effect is important. In such cases the function $f_{OPT}$ becomes dependent on the duty cycles D of the various chopper driving circuits. In practical systems, the variation of armature circuit resistance will have the predominant effect on $f_{OPT}$. Therefore, in such systems, dependence of $f_{OPT}$ on D is reduced to a dependence on the armature chopper duty cycle, or equivalently, on $\omega$.

Another result of specifically using a chopper for a driving circuit is the presence of an ac ripple in that circuit's output current. This ac component can cause an effective change in the resistance of the motor or generator winding that it passes through. This is due to form factor I²R losses, skin effect, and magnetic losses, such as eddy currents and hysteresis. All of these physical effects can be modeled by making the effective circuit resistance a function of both dc current and ac current. Since ac current is a function of chopper duty cycle $D_i$, $f_{OPT}$ is dependent on D. Thus, different loss mechanisms are modeled as I²R losses, which then allows the optimization scheme of the present invention to be applied. Since accurate modeling of motor systems using chopper controllers is difficult, the determination of equivalent resistance may have to be done entirely experimentally.

Reference: "Series Motor Parameter Variations as a Function of Frequency and Saturation", by H. B. Hamilton and Elias Strangas, IEEE PES Winter Meeting, New York, N.Y., Feb. 3–8, 1980.

In fact, $f_{OPT}$ can be determined entirely experimentally. A motor or generator is operated at a fixed torque and speed while the separately excited field current is varied. The value of separately excited field current that minimizes the input power to the system (for a motor) or that maximizes the output power (for a generator) is the desired value at that torque and speed. Those values, along with the corresponding values of armature current for each torque and speed, are the values of $f_{OPT}$.

Accordingly, the power loss minimization of the present invention is achieved for separately excited electromechanical energy conversion devices having a shunt field by controlling the separately excited field current, $I_F$, so as to be $f_{OPT}(I_A, I_P)$, where $I_F = f_{OPT}(I_A, I_P)$ is the solution to (4).

Accordingly, also, the power loss minimization of the present invention is achieved for separately excited electromechanical energy conversion devices lacking a shunt field by simultaneously controlling the armature current, $I_A$, and the separately excited field current, $I_F$, such that $I_F = f_{OPT}(I_A)$ or $I_A = f_{OPT}^{-1}(I_F)$, where the latter is the solution to 5.

The Apparatus

1. Two embodiments of the present invention for separately excited electromechanical energy conversion devices having a shunt field are described.

(a) FIG. 3 is a block diagram of one embodiment of the present invention. The External Command Device 11 generates a current command $V_{IAPC}$ to the Armature Controlling Circuit 12. This in turn operates the Armature Driving Circuit 10, causing the Armature 9 and the Series Field 8, in parallel with the Shunt Field 1, to have a total current equal to $I_A + I_P$ following in them. Shunt Field current $I_P$ is detected by the Shunt Field Current Sensor 13 which outputs signal $V_{IPD}$ to the Function Generator 14. The latter, which also receives $V_{IAPC}$ from the External Command Device, generates a current command $V_{IFC}$ to the Field Controlling Circuit 15, where $V_{IFC} = f_{OPT}[(V_{IAPC} - V_{IPD}), V_{IPD}]$. This in turn operates the Field Driving Circuit 4, driving current $I_F$ through the Separately Excited Field 3, where $I_F = f_{OPT}(I_A, I_p)$.

If the embodiment of FIG. 3 where a chopper controller, then function generator 14 would also receive a signal representing the duty cycle D, as shown in dotted lines. The effect of this would be to minimize total system power loss.

(b) FIG. 4 is a block diagram of another embodiment of the present invention. The External Command Device 11 generates a command $V_{AC}$ to the Armature Controlling Circuit 12. This in turn operates the Armature Driving Circuit 10. Armature current $I_A$ is detected by the Armature Current Sensor 16, which outputs signal $V_{IAD}$ to the Function Generator 14. Shunt Field current $I_P$ is detected by the Shunt Field Current Sensor 13, which outputs signal $V_{IPD}$ to the Function Generator. The latter generates a current command $V_{IFC}$ to the Field Controlling Circuit 15, where $V_{IFC} = f_{OPT}(V_{IAD}, V_{IPD})$. This in turn operates the Field Driving Circuit 4, driving current $I_F$ through the Separately Excited Field 3, where $I_F = f_{OPT}(I_A, I_p)$.

If there is no permanent magnet field and no constantly excited field in the energy conversion device, and if this embodiment is used for converting mechanical energy to electrical energy, then $f_{OPT}$ may have to be changed slightly to make $I_F$ non-zero when $I_A$ is zero. Otherwise, generation may not be able to start up.

If the embodiment of FIG. 4 were a chopper controller, then function generator 14 would also receive a signal representing the duty cycle D for reasons described in connection with FIG. 3.

2. Four embodiments of the present invention for separately excited electromechanical energy conversion devices lacking a shunt field are described. Before discussing these found embodiments, note that FIGS. 5-8 show the signal representing the duty cycle D should these embodiments be chopper controllers and for reasons previously described.

(a) FIG. 5 is a block diagram of another embodiment of the present invention. The External Command Device 11 generates a current command $V_{IAC}$ to the Armature Controlling Circuit 12. This in turn operates the Armature Driving Circuit 10, causing the Armature 9 and the Series Field 8 to have current $I_A$ flowing in them. $V_{IAC}$ also operates the Function Generator 14, which generates current command $V_{IFC}$ to the Field Controlling Circuit 15, where $V_{IFC} = f_{OPT}(V_{IAC})$. This in turn operates the Field Driving Circuit 4, driving current $I_F$ through the Separately Excited Field 3, where $I_F = f_{OPT}(I_A)$.

(b) FIG. 6 is a block diagram of another embodiment of the present invention. The External Command Device 11 generates a command $V_{AC}$ to the Armature Controlling Circuit 12. This in turn operates the Armature Driving Circuit, 10. Armature current $I_A$ is detected by the Armature Current Sensor 16, which outputs signal $V_{IAD}$ to the Function Generator 14. The latter generates a current command $V_{IFC}$ to the Field Controlling Circuit 15, where $V_{IFC} = f_{OPT}(V_{IAD})$. This in turn operates the Field Driving Circuit 4, driving current $I_F$ through the Separately Excited Field 3, where $I_F = f_{OPT}(I_A)$.

If there is no permanent magnet field and no constantly excited field in the energy conversion device, and if this embodiment is used for converting mechanical energy to electrical energy, then $f_{OPT}$ may have to be changed slightly to make $I_F$ non-zero when $I_A$ is zero. Otherwise, generation may not be able to start up.

(c) FIG. 7 is a block diagram of another embodiment of the present invention. The External Command Device 11 generates a current command $V_{IFC}$ to the Field Controlling Circuit 15. This in turn operates the Field Driving Circuit 4, driving current $I_F$ through the Separately Excited Field 3. $V_{IFC}$ also operates the Function Generator 14, which generates a current command $V_{IAC}$ to the Armature Controlling Circuit 12, where $V_{IAC} = f_{OPT}^{-1}(V_{IFC})$. This in turn operates the Armature Driving Circuit 10, causing the Armature 9 and the Series Field 8 to have current $I_A$ flowing in them, where $I_A = f_{OPT}^{-1}(I_F)$.

(d) FIG. 8 is a block diagram of another embodiment of the present invention. The External Command Device 11 generates a command $V_{FC}$ to the Field Controlling Circuit 15. This in turn operates the Field Driving Circuit 4. Separately Excited Field current $I_F$ is detected by the Separately Excited Field Current Sensor 17, which outputs signal $V_{IFD}$ to the Function Generator 14. The latter generates a current command $V_{IAC}$ to the Armature Controlling Circuit 12, where $V_{IAC} = f_{OPT}^{-1}(V_{IFD})$. This in turn operates the Armature Driving Circuit 10, causing the Armature 9 and the Series Field 8 to have current $I_A$ flowing in them, where $I_A = f_{OPT}^{-1}(I_F)$.

3. These embodiments of the present invention are constructed with functional blocks whose implementation is known to those skilled in the art. However, for completeness, a brief description of some of the ways in which each functional block can be implemented is included. The numbers refer to FIGS. 3 through 8.

(a) The External Command Device 11 can be a voltage source, such as a variable resistor with one end grounded, the other end connected to a fixed voltage, and the center tap as the output.

(b) The Armature Controlling Circuit 12 and the Field Controlling Circuit 15 can each be implemented as a time ratio control circuit. This can be a pulse width modulator operating at a fixed frequency. It can also be a voltage to frequency converter operating with a fixed pulse width. Variable pulse width and variable frequency operation can be combined together to achieve time ratio control, also.

(c) The Armature Driving Circuit 10 and the Field Driving Circuit 4 can each be implemented by various power switching devices combined with a diode. Driven by a time ratio control circuit, the switching device is operated to be alternately on (conducting) or off (non-conducting). The diode allows current to flow in the load during the time that the switching device is off. Silicon-controlled rectifiers, power transistors, Darlington transistors, and power field effect transistors are all commonly employed in this application. For high current controllers, a parallel connection of these parts can be used to achieve the desired current handling capability.

(d) The Armature Current Sensor 16, the Shunt Field Current Sensor 13, and the Separately Excited Field Current Sensor 17 can each be implemented by a non-inductive resistor, such as those used as ampere meter shunts. Another type of device that can be used is a Hall effect current probe.

(e) The Function Generator 14 can be implemented by using one of several analog techniques. A power series approximation of $f_{OPT}$ or $f_{OPT}^{-1}$ can be constructed with multipliers and summing amplifiers. A piecewise-linear approximation of $f_{OPT}$ or $f_{OPT}^{-1}$ can be built using amplifiers and diodes. An excellent reference on this topic is the "Nonlinear Circuits Handbook" published by Analog Devices, Inc., Norwood, Mass. 02062, 1974, chapter 2-1.

A combination digital and analog technique can also be used. A Read Only Memory (ROM) serves as a look up table for the desired function. The ROM is addressed by the digital output of an analog to digital converter (for $f_{OPT}(I_A)$ or $f_{OPT}^{-1}(I_F)$) or converters (for $f_{OPT}(I_A, I_P)$). The output of the ROM feeds a digital to analog converter to change the digital value of the function to analog form.

In the case of $f_{OPT}$ being dependent on D an analog signal proportional to $D_i$ can be obtained by low pass filtering the pulse train that drives the switch in chopper i. The previously described analog or comination analog-digital techniques can then be applied.

4. FIGS. 9 through 14 are the schematic of a controller designed for use in an electric vehicle. This controller can drive a dc motor or it can operate the motor as a generator to recharge the vehicle's batteries (regenerative braking). Each figure of the schematic shows one functional block of FIG. 5, upon which this controller is based.

(a) FIG. 9 is the schematic of an External Command Device. The armature current command $V_{IAC}$ is selected by the multiplexer 18 from the analog output of either the 5 kilohm potentiometer in the accelerator pedal 19 or the 5 kilohm potentiometer in the brake pedal 20. The selection of the command source is made by the digital signal $\overline{\text{BRAKEB}}$, which comes from a switch in the brake pedal 21. The signal SHUTDOWN turns off the controller when neither pedal is engaged or when both pedals are engaged.

(b) FIG. 10 is the schematic of a Function Generator. Armature current command $V_{IAC}$ is compared to two reference voltages by comparators 24 and 25. The digital outputs of the comparators control the multiplexer 26, which selects a fixed offset (through the X inputs of the multiplexer) to be added to a selected fraction of $V_{IAC}$ (through the Y inputs of the multiplexer). The result is the field current command $V_{IFC}$. The values of the resistors are chosen to make $V_{IFC} \approx f_{OPT}(V_{IAC})$ for the particular motor being used. $f_{OPT}(V_{IAC})$ is approximated by a four section piecewise-linear function of $V_{IAC}$. The first three sections are achieved by selecting resistor values to make the fractions of $V_{IAC}$ going into the Y inputs of the multiplexer equal to the slopes of the piecewise-linear approximation above each of the first three breakpoints, and by selecting the values of the remaining resistors to make the fixed offsets going into the X inputs of the multiplexer such that $V_{IFC}=f_{OPT}(V_{IAC})$ at the first three breakpoints of the piecewise-linear approximation. The fourth section is a current limit region, and is reached when the +Current Limit Sense input of the Field Controlling Circuit pulse width modulator (37 in FIG. 12) receives a signal greater than +200 millivolts.

(c) FIG. 11 is the schematic of an Armature Controlling Circuit. The output of the current sensor 27 is amplified times 32 by a differential amplifier circuit whose active elements are amplifiers 28 and 29. The multiplexer 61 selects between an inverting differential amplifier circuit and a non-inverting differential amplifier circuit. This is necessary because current in the current sensor flows in one direction during accelerating and in the other direction during braking. The pulse width modulator 30 receives its current command $V_{IAC}$ from the External Command Device (FIG. 9) and receives a reference related to the amount of current flowing in the armature from the output of the differential amplifier circuit. The output of the pulse width modulator is low true ANDed separately with $\overline{\text{ACCELERATEB}}$ and $\overline{\text{BRAKEB}}$ by OR gates 31 and 32. The resulting signals and their complements, namely $\overline{\text{PWMACCELB}}$ and PWMACCEL, and $\overline{\text{PWMBRAKEB}}$ and PWNBRAKE, operate the Armature Driving Circuit. $\overline{\text{SYNCB}}$ and $C_T$ connect to the Field Controlling Circuit (FIG. 12) and synchronize the pulse width modulator in that circuit with the Armature Controlling Circuit pulse width modulator.

(d) FIG. 12 is the schematic of a Field Controlling Circuit. The output of the current sensor 35 is amplified times 32 by a differential amplifier circuit whose active element is amplifier 36. The amplifier's output provides the pulse width modulator 37 with a reference related to the amount of current flowing in the field winding. The pulse width modulator receives its current command $V_{IFC}$ from the Function Generator (FIG. 10). $\overline{\text{SYNCB}}$ and $C_T$ originate in the Armature Controlling Circuit (FIG. 11) and synchronize the pulse width modulators 30 and 37 in the two controlling circuits. The output of the pulse width modulator 37 is $\overline{\text{PWMFIELDB}}$. This signal and its complement, PWMFIELD, operate the field driving circuit.

(e) FIG. 13 is the schematic of an Armature Driving Circuit. In the accelerating mode, when PWMACCEL goes high transistor 39 turns on, which then turns on the high current transistor 40. When PWMACCEL is low, there is no base drive to transistor 40 from transistor 39. Also, $\overline{\text{PWMACCELB}}$ is high, turning on transistor 41, which then turns on transistor 42. The latter removes stored charge from high current transistor 40, causing it to turn off rapidly. When high current transistor 40 is off, current flowing in the armature can continue to circulate through diode 43. The result is a dc-dc converter from V+ to the motor back emf, where V+ > back emf.

In the regenerative braking mode, when $\overline{\text{PWMBRAKEB}}$ goes low transistor 44 turns on, which then turns on the high current transistor 45. When $\overline{\text{PWMBRAKEB}}$ is high, there is no base drive to transistor 45 from transistor 44. Also, PWMBRAKE is low, turning on transistor 46, which then turns on transistor 47. The latter removes stored charge from high current transistor 45, causing it to turn off rapidly. When high current transistor 45 is off, current flowing in the armature can flow through diode 48 into the V+ supply. The result is a dc-dc converter from the motor back emf to V+, where V+ > back emf.

This circuit is rated for 20 Amperes of armature current. For each additional 20 Amperes of current, the circuitry within the dotted line 49 must be replicated and added in parallel to that shown in FIG. 13. If this is done, then the values of the base resistors 50 and 51 for high current transistors 40 and 45, respectively, must be selected individually for each of the paralleled transistors such that they share their load equally.

(f) FIG. 14 is the schematic of a Field Driving Circuit. Its operation is identical to that of the Armature Driving Circuit in the accelerating mode.

(g) The following table gives the manufacturer and the manufacturer's part number for the integrated circuits and transistors in this controller. Two gates from the same integrated circuit together in parallel for greater drive capability is indicated by *.

| Reference # | Part # | Manufacturer |
|---|---|---|
| 18,61 | CD4007C | Nat'l Semiconductor Corp., Santa Clara, CA |
| 22 | MM74C86 | Nat'l Semiconductor Corp., Santa Clara, CA |
| 23,*33,*34,*38 | MM74C04 | Nat'l Semiconductor Corp., Santa Clara, CA |
| 26 | CD4052C | Nat'l Semiconductor Corp., Santa Clara, CA |

-continued

| Reference # | Part # | Manufacturer |
|---|---|---|
| 31,*32 | MM74C32 | Nat'l Semiconductor Corp., Santa Clara, CA |
| 24,25,28,29,36 | LM224 | Motorola, Inc., Phoenix, AZ |
| 40,59 | MJ11033 | Motorola, Inc., Phoenix, AZ |
| 45 | MJ11032 | Motorola, Inc., Phoenix, AZ |
| 42,57 | 2N3906 | Motorola, Inc., Phoenix, AZ |
| 47 | 2N3904 | Motorola, Inc., Phoenix, AZ |
| 52,53,54,55 | 1N4003 | Motorola, Inc., Phoenix, AZ |
| 60 | MR1121 | Motorola, Inc., Phoenix, AZ |
| 30,37 | SG1524 | Silicon General Inc., Garden Grove, CA |
| 43,48 | 6220135CJ | Westinghouse Electric Corp., Youngwood, PA |
| 39,41,56,58 | RCP701D | RCA Corporation, Somersville, NJ |
| 44,46 | RCP700D | RCA Corporation, Somersville, NJ |

The above description of the present invention provides a general method for improving the operating efficiency of electromechanical energy conversion devices and also provides several embodiments of the invention. Controllers embodying the present invention can be used, for example, in industrial motor control, electric vehicle control (including both accelerating and regenerative braking) and the control of generators. Additional possible variations of the method and apparatus of the present invention will be evident to those skilled in the art.

What is claimed is:

1. A method for minimizing, by use of a predetermined optimizing function, the loss of power in a separately excited electromechanical energy conversion device and in a controller of said energy conversion device, said energy conversion device having n spatially fixed windings, $n \geq 1$, for producing a first magnetic field, and having m movable windings, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said method comprising:

the step of first generating a command signal having a magnitude A;

the step of generating currents $I_1(A)$, $I_2(A)$, ..., $I_n(A)$ in said n spatially fixed windings, respectively;

and the step of generating currents $I_{n+1}(A)$, $I_{n+2}(A)$, ..., $I_{n+m}(A)$ in said m movable windings, respectively;

wherein said currents $I_1(A), I_2(A), ..., I_n(A), I_{n+1}(A), I_{n+2}(A), ..., I_{n+m}(A)$ are selected in such a manner that their magnitudes as a function of said command signal having a magnitude A satisfy said predetermined optimizing function;

and wherein said predetermined optimizing function takes into account the incremental changes in said first and second magnetic fields caused by each of said n+m currents in each of said n+m windings.

2. An apparatus for minimizing, by use of a predetermined optimizing function, the loss of power in a separately excited electromechanical energy conversion device and in a controller of said energy conversion device, said energy conversion device having n spatially fixed windings, $n \geq 1$, for producing a first magnetic field, and having m movable windings, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal having a magnitude A;

means for generating currents $I_1(A)$, $I_2(A)$, ..., $I_n(A)$ in said n spatially fixed windings, respectively;

and means for generating currents $I_{n+1}(A)$, $I_{n+2}(A)$, ..., $I_{n+m}(A)$ in said m movable windings, respectively;

wherein said currents $I_1(A), I_2(A), ..., I_n(A), I_{n+1}(A), I_{n+2}(A), ..., I_{n+m}(A)$ are selected in such a manner that their magnitudes as a function of said command signal having a magnitude A satisfy said predetermined optimizing function;

and wherein said predetermined optimizing function takes into account the incremental changes in said first and second magnetic fields caused by each of said n+m currents in each of said n+m windings.

3. An apparatus as in claim 2 wherein the n spatially fixed windings comprise at least a shunt field winding and a separately excited field winding, and wherein the m movable windings comprise armature windings; and wherein said means for generating currents $I_1(A), I_2(A), ..., I_n(A)$ includes function generator means for generating said currents in the separately excited field winding, said function generator means receiving said command signal A and receiving a signal representing the magnitude of current in said shunt field winding.

4. An apparatus as in claim 2 wherein the n spatially fixed windings comprise at least a shunt field winding and a separately excited field winding, and wherein the m movable windings comprise armature windings; and wherein said means for generating currents $I_1(A), I_2(A), ..., I_n(A)$ includes function generator means for generating said currents in the separately excited field winding, said function generator means receiving a signal representing the magnitude of current in said armature windings and receiving a signal representing the magnitude of current in said shunt field winding.

5. An apparatus as in claim 2 wherein the n spatially fixed windings comprise at least a separately excited field winding, and wherein the m movable windings comprise armature windings; and wherein said means for generating currents $I_1(A), I_2(A), ..., I_n(A)$ includes function generator means for generating said currents in the separately excited field winding, said function generator means receiving said command signal A.

6. An apparatus as in claim 2 wherein the n spatially fixed windings comprise at least a separately excited field winding, and wherein the m movable windings comprise armature windings; and wherein said means for generating currents $I_1(A), I_2(A), ..., I_n(A)$ includes function generator means for generating said currents in the separately excited field winding, said function generator means receiving a signal representing the magnitude of current in said armature windings.

7. An apparatus as in claim 2 wherein the n spatially fixed windings comprise at least a separately excited field winding, and wherein the m movable windings comprise armature windings; and wherein said means for generating currents $I_{n+1}(A)$, $I_{n+2}(A), \ldots, I_{n+m}(A)$ includes function generator means for generating said currents in the armature windings, said function generator means receiving said command signal A.

8. An apparatus as in claim 2 wherein the n spatially fixed windings comprise at least a separately excited field winding, and wherein the m movable windings comprise armature windings; and wherein said means for generating currents $I_{n+1}(A)$, $I_{n+2}(A), \ldots, I_{n+m}(A)$ includes function generator means for generating said currents in the armature windings, said function generator means receiving a signal representing the magnitude of current in said separately excited field winding.

9. A method for minimizing, by use of an optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings, $n \geq 1$, for providing a first magnetic field, and having m movable windings, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said method comprising;

the step of first generating a command signal A;

the step of generating currents $I_1(A), I_2(A), \ldots, I_n(A)$ in said n spatially fixed windings, respectively;

and the step of generating currents $I_{n+1}(A), I_{n+2}(A), \ldots, I_{n+m}(A)$ in said m movable windings, respectively;

wherein said currents $I_1(A), I_2(A), \ldots I_n(A), I_{n+1}(A), I_{n+2}(A), \ldots I_{n+m}(A)$ are selected in such a manner that their magnitudes as a function of said command signal A satisfy said optimizing function;

and wherein said optimizing function takes into account the incremental changes in said first and second magnetic fields caused by each of said n+m currents in each of said n+m windings.

10. An apparatus for minimizing, by use of an optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings, $n \geq 1$, for providing a first magnetic field, and having m movable windings, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal A;

means for generating currents $I_1(A), I_2(A), \ldots, I_n(A)$ in said n spatially fixed windings, respectively;

and means for generating currents $I_{n+1}(A), I_{n+2}(A), \ldots, I_{n+m}(A)$ in said m movable windings, respectively;

wherein said currents $I_1(A), I_2(A), \ldots, I_n(A), I_{n+1}(A), I_{n+2}(A), \ldots, I_{n+m}(A)$ are selected in such a manner that their magnitudes as a function of said command signal A satisfy said optimizing function;

and wherein said optimizing function takes into account the incremental changes in said first magnetic field caused by said n currents in each of said n windings.

11. An apparatus for minimizing, by use of an optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings, $n \geq 1$, for providing a first magnetic field, and having m movable windings, $m \cong 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal A;

means for generating currents $I_1(A), I_2(A), \ldots, I_n(A)$ in said n spatially fixed windings, respectively;

and means for generating currents $I_{n+1}(A), I_{n+2}(A), \ldots, I_{n+m}(A)$ in said m movable windings, respectively;

wherein said currents $I_1(A), I_2(A), \ldots, I_n(A), I_{n+1}(A), I_{n+2}(A), \ldots, I_{n+m}(A)$ are selected in such a manner that their magnitudes as a function of said command signal A satisfy said optimizing function;

and wherein said optimizing function takes into account the incremental changes in said first magnetic field caused by said m currents in each of said m windings.

12. An apparatus for minimizing, by use of an optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings having resistance, $n \geq 1$, for providing a first magnetic field, and having m movable windings, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal A;

means for generating currents $I_1(A), I_2(A), \ldots, I_n(A)$ in said n spatially fixed windings, respectively;

and means for generating currents $I_{n+1}(A), I_{n+2}(A), \ldots, I_{n+m}(A)$ in said m movable windings, respectively;

wherein said currents $I_1(A), I_2(A), \ldots, I_n(A), I_{n+1}(A), I_{n+2}(A), \ldots, I_{n+m}(A)$ are selected in such a manner that their magnitudes as a function of said command signal A satisfy said optimizing function;

and wherein said optimizing function takes into account the incremental changes in said resistance of said n windings as a function of said n currents.

13. An apparatus for minimizing, by use of an optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings, $n \geq 1$, for providing a first magnetic field, and having m movable windings having resistance, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal A;
means for generating currents $I_1(A), I_2(A), \ldots, I_n(A)$ in said n spatially fixed windings, respectively;
and means for generating currents $I_{n+1}(A), I_{n+2}(A), \ldots, I_{n+m}(A)$ in said m movable windings, respectively;
wherein said currents $I_1(A), I_2(A), \ldots, I_n(A), I_{n+1}(A), I_{n+2}(A), \ldots, I_{n+m}(A)$ are selected in such a manner that their magnitudes as a function of said command signal A satisfy said optimizing function;
and wherein said optimizing function takes into account the incremental changes in said resistance of said m windings as a function of said m currents.

14. An apparatus for minimizing, by use of an optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings having resistance, $n \geq 1$, for providing a first magnetic field, and having m movable windings having resistance, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal A;
means for generating currents $I_1(A), I_2(A), \ldots, I_n(A)$ in said n spatially fixed windings, respectively;
and means for generating currents $I_{n+1}(A), I_{n+2}(A), \ldots, I_{n+m}(A)$ in said m movable windings, respectively;
wherein said currents $I_1(A), I_2(A), \ldots, I_n(A), I_{n+1}(A), I_{n+2}(A), \ldots, I_{n+m}(A)$ are selected in such a manner that their magnitudes as a function of said command signal A satisfy said optimizing function;
and wherein said optimizing function takes into account the incremental changes in said resistance of said n+m windings as a function of said n+m currents.

15. An apparatus for minimizing, by use of a predetermined optimizing function, the total loss of power in a circuit having power loss components including a separately excited electromechanical energy conversion device, a controller of said energy conversion device, and a power source if said energy conversion device is a motor or a load if said energy conversion device is a generator, said energy conversion device having n spatially fixed windings, $n \geq 1$, for providing a first magnetic field, and having m movable windings, $m \geq 1$, for producing a second magnetic field which opposes said first magnetic field produced by said n spatially fixed windings, such that said first magnetic field produced by said n spatially fixed windings can be varied, at least in part, independently of said second magnetic field produced by said m movable windings, said apparatus comprising:

means for first generating a command signal A;
means for generating currents $I_1(A), I_2(A), \ldots, I_n(A)$ in said n spatially fixed windings, respectively;
and means for generating currents $I_{n+1}(A), I_{n+2}(A), \ldots, I_{n+m}(A)$ in said m movable windings, respectively;
wherein said currents $I_1(A), I_2(A), \ldots, I_n(A), I_{n+1}(A), I_{n+2}(A), \ldots, I_{n+m}(A)$ are selected in such a manner that their magnitudes as a function of said command signal A satisfy said optimizing function;
and wherein said optimizing function takes into account the incremental changes in said first and second magnetic fields caused by each of said n+m currents in each of said n+m windings.

16. An apparatus as in claim 15 wherein the n spatially fixed windings comprise at least a shunt field winding and a separately excited field winding, and wherein the m movable windings comprise armature windings and wherein said controller is a chopper controller having a multi-valued duty cycle D, where $D = [D_i$ for said chopper controller that produces $I_i(A)$, $1 \geq i \geq n+m]$; and wherein said means for generating currents $I_1(A), I_2(A), \ldots, I_n(A)$ includes function generator means for generating said currents in the separately excited field winding, said function generator means receiving said command signal A, a signal representing the magnitude of current in said shunt field winding and a signal representing the duty cycle D.

17. An apparatus as in claim 15 wherein the n spatially fixed windings comprise at least a shunt field winding and a separately excited field winding, and wherein the m movable windings comprise armature windings and wherein said controller is a chopper controller having a multi-valued duty cycle D, where $D = [D_i$ for said chopper controller that produces current $I_i(A)$, $1 \geq i \geq n+m]$; and wherein said means for generating currents $I_1(A), I_2(A), \ldots, I_n(A)$ includes function generator means for generating said currents in the separately excited field winding, said function generator means receiving a signal representing the magnitude of current in said armature windings, a signal representing the magnitude of current in said shunt field winding and a signal representing the duty cycle D.

18. An apparatus as in claim 15 wherein the n spatially fixed windings comprise at least a separately excited field winding, and wherein the m movable windings comprise armature windings and wherein said controller is a chopper controller having a multivalued duty cycle D, where $D = [D_i$ for said chopper controller that produces current $I_i(A)$, $1 \geq i \geq n+m]$; and wherein said means for generating currents $I_1(A), I_2(A), \ldots, I_n(A)$ includes function generator means for generating said currents in the separately excited field winding, said function generator means receiving said comm; and signal A and a signal representing the duty cycle D.

19. An apparatus as in claim 15 wherein the n spatially fixed windings comprise at least a separately excited field winding, wherein the m movable windings comprise armature windings and wherein said controller is a chopper controller having a multi-valued duty cycle D, where $D = [D_i$ for said chopper controller that produces current $I_i(A)$, $1 \geq i \geq n+m]$; and wherein said means for generating currents $I_1(A), I_2(A), \ldots, I_n(A)$ includes function generator means for generating said currents in the separately excited field winding, said function generator means receiving a signal representing the magnitude of current in said armature windings and a signal representing the duty cycle D.

20. An apparatus as in claim 15 wherein the n spatially fixed windings comprise at least a separately excited field winding, and wherein the m movable windings comprise armature windings and wherein said controller is a chopper controller having a multi-valued duty cycle D, where $D = [D_i$ for said chopper controller that produces current $I_i(A)$, $1 \geq i \geq n+m]$; and wherein said means for generating currents $I_{n+1}(A), I_{n+2}(A), \ldots, I_{n+m}(A)$ includes function generator means for generating said currents in the armature windings, said function generator means receiving said command signal A and a signal representing the duty cycle D.

21. An apparatus as in claim 15 wherein the n spatially fixed windings comprise at least a separately excited field winding, and wherein the m movable windings comprise armature windings and wherein said controller is a chopper controller having a multi-valued duty cycle D, where $D = [D_i$ for said chopper controller that produces current $I_i(A)$, $1 \geq i \geq n+m]$; and wherein said means for generating currents $I_{n+1}(A), I_{n+2}(A), \ldots, I_{n+m}(A)$ includes function generator means for generating said currents in the armature windings, said function generator means receiving a signal representing the magnitude of current in said separately excited field winding and a signal representing the duty cycle D.

* * * * *

UNITED STATES PATENT AND TRADEMARK OFFICE
CERTIFICATE OF CORRECTION

PATENT NO. : 4,408,147
DATED : October 4, 1983
INVENTOR(S) : Jonathan Gabel

It is certified that error appears in the above-identified patent and that said Letters Patent is hereby corrected as shown below:

Column 1, line 38, "zf" should be -- of --.

Column 6, line 14 should be $\partial R_A/\partial I_A$ and $\partial R_F/\partial I_F$
Column 6, line 64 should be:
$$I^2_{SOURCE} \times R_{SOURCE} = (D^2 \times R_{SOURCE}) \times I^2_{MOTOR}$$
Column 16, line 18 should read "windings, m≥1, for"
Column 18, line 35 should read "1≤i≤n+m]; and"
Column 18, line 50 should read "1≤i≤n+m]; and"
Column 18, line 65 should read "1≤i≤n+m]; and"
Column 19, line 10 should read "1≤i≤n+m]; and"
Column 20, line 2 should read "1≤i≤n+m]; and"
Column 20 line 15 should read "1≤i≤n+m]; and"

Signed and Sealed this

Seventh Day of May 1985

[SEAL]

Attest:

DONALD J. QUIGG

Attesting Officer  Acting Commissioner of Patents and Trademarks